US011840485B2

(12) United States Patent
Mollamahmutoglu et al.

(10) Patent No.: US 11,840,485 B2
(45) Date of Patent: Dec. 12, 2023

(54) METHOD FOR PREPARING AN INJECTION MATERIAL AND THE OBTAINED INJECTION MATERIAL

(71) Applicants: BURSA TEKNIK ÜNIVERSITESI, Bursa (AR); GAZI ÜNIVERSITESI, Ankara (AR)

(72) Inventors: Murat Mollamahmutoglu, Ankara (TR); Eyübhan Avci, Bursa (TR)

( * ) Notice: Subject to any disclaimer, the term of this patent is extended or adjusted under 35 U.S.C. 154(b) by 88 days.

(21) Appl. No.: 17/595,756

(22) PCT Filed: Apr. 22, 2020

(86) PCT No.: PCT/TR2020/050339
§ 371 (c)(1),
(2) Date: Nov. 23, 2021

(87) PCT Pub. No.: WO2020/236107
PCT Pub. Date: Nov. 26, 2020

(65) Prior Publication Data
US 2022/0212997 A1   Jul. 7, 2022

(51) Int. Cl.
C04B 28/26 (2006.01)
B01F 21/10 (2022.01)
B01F 33/45 (2022.01)
E02D 3/12 (2006.01)
C04B 111/00 (2006.01)

(52) U.S. Cl.
CPC .............. *C04B 28/26* (2013.01); *B01F 21/10* (2022.01); *B01F 33/45* (2022.01); *E02D 3/12* (2013.01); *C04B 2111/00732* (2013.01); *E02D 2250/003* (2013.01)

(58) Field of Classification Search
CPC . C04B 28/26; C04B 2111/00732; E02D 3/12; E02D 2250/003
See application file for complete search history.

(56) References Cited

U.S. PATENT DOCUMENTS

| | | | | | |
|---|---|---|---|---|---|
| 3,663,249 A | * | 5/1972 | Rao | ....................... | C03C 11/007 106/629 |
| 3,884,839 A | * | 5/1975 | Bon | ....................... | G21F 1/06 376/288 |
| 4,194,918 A | * | 3/1980 | George | ................... | C04B 28/26 106/617 |
| 4,203,773 A | * | 5/1980 | Temple | ............... | C04B 20/1051 106/606 |
| 4,329,177 A | * | 5/1982 | George | ................... | B22C 1/167 106/617 |
| 4,396,723 A | * | 8/1983 | Temple | ................. | C04B 18/027 501/80 |
| 5,084,260 A | * | 1/1992 | Bertocci | ............... | C01B 35/109 23/296 |
| 5,246,654 A | * | 9/1993 | Ertle | ......................... | B29B 9/06 264/141 |
| 5,501,826 A | * | 3/1996 | Ertle | ......................... | B29B 9/06 264/141 |
| 2009/0230352 A1 | * | 9/2009 | Gimvang | .............. | C04B 40/065 252/182.33 |
| 2020/0407233 A1 | * | 12/2020 | Yakar Elbeyli | ...... | B01D 21/267 |

FOREIGN PATENT DOCUMENTS

| | | |
|---|---|---|
| JP | H1036842 A | 2/1998 |
| KR | 20090022342 A | 3/2009 |
| KR | 101697964 B1 | 1/2017 |
| WO | 2009015520 A | 2/2009 |

OTHER PUBLICATIONS

International Search Report for corresponding PCT/TR2020/050339, dated Aug. 26, 2020.
Written Opinion of the International Searching Authority for corresponding PCT/TR2020/050339, dated Aug. 26, 2020.

* cited by examiner

*Primary Examiner* — Benjamin F Fiorello
(74) *Attorney, Agent, or Firm* — Egbert, McDaniel & Swartz, PLLC

(57) ABSTRACT

Disclosed is a method for preparing a mixture and the injection material to be used as soil injection material to close the pores after a certain gelling period by applying it to the pores in the silt size, including the steps of: (a) preparation of a mixture of sodium silicate with a $SiO_2/Na_2O$ ratio of 3-4 and water so that their ratio by volume varies between 3/7 and 1/1; (b) obtaining a mixture by dissolving ultra-low sulfated boric acid in water, containing between 2.5-5% by weight of ultra-low sulfated boric acid; and (c) mixing the obtained ultra low sulfate boric acid-water mixture with sodium silicate in the step a.

5 Claims, No Drawings

METHOD FOR PREPARING AN INJECTION MATERIAL AND THE OBTAINED INJECTION MATERIAL

TECHNICAL FIELD

The invention relates to a method of preparing a ground injection material and the injection material to be used in permeation injections of dams, tunnel constructions, permanent and temporary deep excavations, rock fissures, and soils up to silt size that cannot be injected with cement injections within the scope of geotechnical engineering.

Prior Art

Many injection materials are used in permeation injection applications. Portland cements are one of the most used injection materials, but due to their large particle sizes, it is difficult for them to penetrate into the fine and medium sand samples and it is hard to adjust their setting times. For this reason, new injection materials that could penetrate smaller particle sizes were needed. With the development of the chemical injection material, injection into smaller particle sizes has become possible, but the application areas have been limited due to their low strength, high costs, and negative effects on the environment. Hence, there is a need for an environmentally friendly injection material that can provide high strength and low permeability after injection with an adjustable gelling time.

In the scope of the known technique, this material is frequently used in injection applications to prevent such problems. The injection material used in injection applications mostly consists of sodium silicate based materials. In this application, silicate-based materials are neutralized and gelled using a reactant. Many weak acid type materials are used as reactants for this process. These acids are expensive and difficult to supply.

The purpose of permeation injection applications is to ensure that the solution material reaches the soils pores in a timely manner and to gelate after reaching them. During very long gelling times, especially in areas with groundwater, the solution is diluted and gelling cannot be achieved.

Document no. KR101697964B1 discloses a low-cost injection material produced by using recycled resources. The composition comprises a gelling agent containing sodium silicate and binding element mixed with the gelling agent to form a gel type accelerator.

As a result, all issues mentioned above made it necessary to make an innovation in the relevant technical field.

Object of the Innovation

This invention aims to overcome the above-mentioned problems and make a technical innovation in the relevant field.

The main object of the invention is to develop an environmentally friendly injection material to be used in permeation injections of dam soils, tunnel constructions, permanent and temporary deep excavations, rock fissures, and soils up to silt size that cannot be injected with cement injections within the scope of geotechnical engineering.

Another object of the invention is to develop a method for the use of environmentally friendly ultra low sulfate boric acid in soil injection materials and to adjust the gelling time for this use.

Another object of the invention is to increase the strength and decrease the permeability in the soils after injection.

Another object of the invention is to make permeation injection easily to the soil up to silt size.

Another object of the invention is to facilitate control of the pH of the medium by controlling the concentration of ultra low sulfate boric acid and to adjust the gelling time of the solidified material to be formed accordingly.

Another object of the invention is to provide easy injection opportunity even in the flowing groundwater conditions.

Another object of the invention is to ensure the injection to reach the soil pores in a timely manner and to gelate after reaching it. The desired gelling times can be easily adjusted with the developed product.

Another object of the invention is to provide an environmentally friendly injection material.

BRIEF DESCRIPTION OF THE INVENTION

This invention is a method for preparing a material to be applied in the form of permeation injection in soils up to the size of silt, in order to achieve all the objectives mentioned above and included in the detailed description below. Accordingly, the method presented within the scope of the invention includes the following steps: Preparing a mixture of sodium silicate and water provided with a $SiO_2/Na_2O$ ratio of 3-4, so that their ratio by volume varies between 3/7 and 1/1; Obtaining a mixture by dissolving ultra low sulfated boric acid in water, containing ultra low sulfated boric acid between 2.5-5% by weight; Mixing the resulting ultra low sulfate boric acid-water mixture with sodium silicate obtained in the first step.

In a preferred embodiment of the invention, the sodium silicate $SiO_2/Na_2O$ ratio is 3.2.

In a preferred embodiment of the invention, the ultra-low sulfated boric acid ratio added to water is increased to reduce gelling time or decreased to increase gelling time.

In order to achieve all the objectives mentioned above and included in the following detailed description, the invention is an injection material obtained by the method according to any one of claims 1-4, which reinforces the soil by settling in said pores in the soil up to silt size by being injected into the pores in the soil.

DETAILED DESCRIPTION OF THE INVENTION

In this detailed description, a method for preparing an injection material according to the invention and the injection material obtained are described only with examples that will not have any limiting effect in order to better understand the subject.

The subject of the invention is related to the method for the preparation of materials for the geotechnical engineering, where cement mixtures are insufficient, and the construction of dam soils, tunnel constructions, permanent and temporary deep excavations, rock fissures, and permeation injections up to silt size.

In the method of the invention, it is explained how to control the gelling time with the use of ultra low sulfate boric acid. Here, the expression "ultra low sulphate boric acid" is limited to boric acids containing sulphate at a maximum rate of 3 ppm.

Sodium silicates, known as water glass, are prepared by heating silicate sand or silica of any form with $Na_2CO_3$ at around 900° C. After refining, sodium silicate becomes a fluid solution. This solution can be diluted with water to obtain the concentration that meets the need. Sodium silicate is neutralized and gelled using a weak acid or salt acid as a reactant.

In order for sodium silicates to be used as the injection material described in the invention, it is essential that the silica/alkali ratios ($SiO_2/Na_2O$) are between 3 and 4. In a preferred embodiment, this ratio is 3.2.

Organic or inorganic reactants are used in the gelling process of sodium silicates. In this invention, sodium silicate and ultra-low sulfated boric acid of inorganic origin are used. Ultra low sulphate boric acid is dissolved by mixing in water in the mixtures and then mixed with sodium silicate in certain proportions. Sodium silicate and ultra low sulfate materials are mixed and the following reaction occurs.

shown. Here, ultra-low sulphate boric acid is mixed with sodium silicate by using a magnetic stirrer.

| Mixture code | Sodium silicate content (ml.) | Water (ml.) | The amount of boric acid in 100 milliliter of solution (gr.) | Boric acid (by mass)/ water (%) | Gelling times (dk.) |
|---|---|---|---|---|---|
| B1 | 30 | 70 | 3.05 | 4.3 | 10 |
| B2 | 30 | 70 | 2.82 | 4 | 13 |
| B3 | 30 | 70 | 2.61 | 3.7 | 23 |
| B4 | 30 | 70 | 2.41 | 3.4 | 37 |
| B5 | 30 | 70 | 2.22 | 3.1 | 112 |

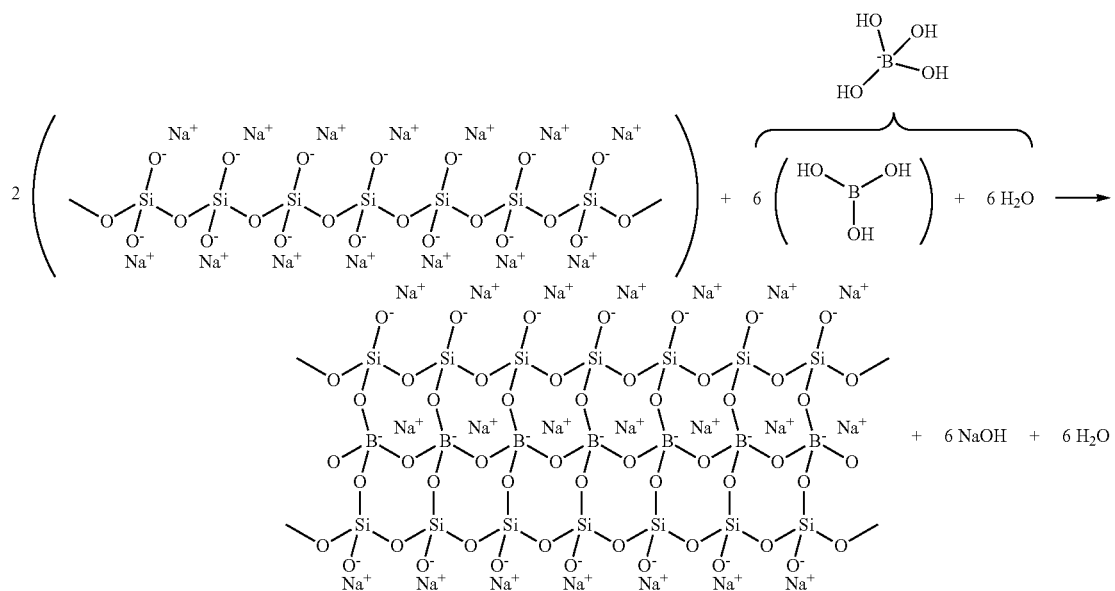

According to the reaction equation, when sodium silicate, which is alkaline in nature, is diluted, it ionizes by hydrolysing in aqueous medium. $Na^+$ cations and tetrahedral silica chains are surrounded by $H_2$ molecules. When an aqueous ultra low sulfate boric acid solution with concentrated concentrate is added on this alkaline solution, it gradually enters the sodium silicate chains of the polymeric chain structure, which is in the form of a polymeric chain, and draws the pH of the environment towards neutral levels.

When the ambient pH is neutral, the polymeric sodium borosilicate structure proposed by the products in the above reaction begins to form and mechanical setting occurs accordingly.

When a trigonal structure ultra low sulfate boric acid aqueous solution is prepared, it turns into a tetragonal (a geometry similar to silicate structure) with hydrolysis, which facilitates the formation of a silicate-like chain to enter among polymeric silicate derivatives. The tetragonal borate structure in anionic character increases the stability of the hard material formed by balancing its charge with the cationic $Na^+$ atoms in the sodium silicate structure.

The reaction that takes place between sodium silicate chains and tetragonal borate anions is a kind of esterification reaction, which is carried out through $H_2O$ elimination. As a result of the reaction described above, the solution gelates.

48 different injections of 100 ml prepared with the inputs in the range given in Table 1 and their gelling times are -continued

| Mixture code | Sodium silicate content (ml.) | Water (ml.) | The amount of boric acid in 100 milliliter of solution (gr.) | Boric acid (by mass)/ water (%) | Gelling times (dk.) |
|---|---|---|---|---|---|
| B6 | 30 | 70 | 2.05 | 2.9 | 187 |
| B7 | 30 | 70 | 1.81 | 2.6 | 275 |
| B8 | 32 | 68 | 3.02 | 4.4 | 12 |
| B9 | 32 | 68 | 2.82 | 4.1 | 19 |
| B10 | 32 | 68 | 2.63 | 3.8 | 33 |
| B11 | 32 | 68 | 2.39 | 3.5 | 60 |
| B12 | 32 | 68 | 2.22 | 3.2 | 140 |
| B13 | 32 | 68 | 2.03 | 2.9 | 240 |
| B14 | 32 | 68 | 1.84 | 2.7 | 305 |
| B15 | 34 | 66 | 3.02 | 4.6 | 18 |
| B16 | 34 | 66 | 2.81 | 4.2 | 20 |
| B17 | 34 | 66 | 2.62 | 3.9 | 45 |
| B18 | 34 | 66 | 2.43 | 3.6 | 75 |
| B19 | 34 | 66 | 2.21 | 3.3 | 184 |
| B20 | 34 | 66 | 2.03 | 3 | 374 |
| B21 | 34 | 66 | 1.82 | 2.8 | 500 |
| B22 | 36 | 64 | 3.01 | 4.7 | 20 |
| B23 | 36 | 64 | 2.82 | 4.4 | 26 |
| B24 | 36 | 64 | 2.61 | 4.1 | 59 |
| B25 | 36 | 64 | 2.43 | 3.8 | 110 |
| B26 | 36 | 64 | 2.22 | 3.4 | 252 |
| B27 | 36 | 64 | 2.04 | 3.1 | 440 |
| B28 | 36 | 64 | 1.82 | 2.8 | 570 |
| B29 | 38 | 62 | 2.91 | 4.7 | 27 |

-continued

| Mixture code | Sodium silicate content (ml.) | Water (ml.) | The amount of boric acid in 100 milliliter of solution (gr.) | Boric acid (by mass)/ water (%) | Gelling times (dk.) |
|---|---|---|---|---|---|
| B30 | 38 | 62 | 2.82 | 4.5 | 35 |
| B31 | 38 | 62 | 2.73 | 4.4 | 55 |
| B32 | 38 | 62 | 2.62 | 4.2 | 65 |
| B33 | 38 | 62 | 2.53 | 4 | 97 |
| B34 | 38 | 62 | 2.42 | 3.9 | 134 |
| B35 | 38 | 62 | 2.31 | 3.7 | 230 |
| B36 | 40 | 60 | 2.84 | 4.7 | 39 |
| B37 | 40 | 60 | 2.72 | 4.5 | 61 |
| B38 | 40 | 60 | 2.61 | 4.3 | 81 |
| B39 | 40 | 60 | 2.53 | 4.2 | 114 |
| B40 | 40 | 60 | 2.42 | 4 | 151 |
| B41 | 40 | 60 | 2.35 | 3.9 | 262 |
| B42 | 40 | 60 | 2.22 | 3.7 | 380 |
| B43 | 42 | 58 | 2.83 | 4.9 | 62 |
| B44 | 42 | 58 | 2.74 | 4.7 | 109 |
| B45 | 42 | 58 | 2.62 | 4.5 | 137 |
| B46 | 42 | 58 | 2.51 | 4.3 | 158 |
| B47 | 42 | 58 | 2.42 | 4.1 | 245 |
| B48 | 50 | 50 | 2.22 | 4.4 | 22 |

As can be seen in Table 1 examples B1-B7, while the amounts of water and sodium silicate have been steadily provided, the gelling time of the injection increases regularly as the amount of ultra-low sulfated boric acid decreases.

In addition, as can be seen in B8, B23, and B31, the amount of ultra-low sulphate boric acid is kept constant by mass, and the gelling time increases when the volume of water is increased compared to sodium silica. In contrast, when the ratio of sodium silicate to volume increases, gelling time decreases.

Strength and Permeability Values Obtained by the Said Injection;

By injection, the unconfined compressive strength of sand samples can be up to 0.50 MPa and the unconfined compressive strength of silt samples can be up to 0.30 MPa. Also, with the developed injection, the permeability coefficients of sand samples decrease to $1\times10^{-6}$ cm/sec and the permeability coefficients of silt samples to $1\times10^{-7}$ cm/sec.

The scope of the protection of the invention is set forth in the annexed claims and certainly cannot be limited to exemplary explanations in this detailed description. It is evident that one skilled in the technique can make similar embodiments in the light of the explanations above without moving away from the main theme of the invention.

The invention claimed is:

1. A method for preparing a material to be applied as a permeation injection in soils up to silt size, the method comprising the steps of:
    a) preparing a first mixture comprising sodium silicate and water with a sodium silicate/water ratio by volume between 3/7 and 1/1, the sodium silicate having a $SiO_2/Na_2O$ weight ratio of 3-4;
    b) preparing a second mixture by dissolving ultra-low sulfated boric acid in water, the second mixture containing between 2.5-5% by weight of ultra-low sulfated boric acid; and
    c) mixing the first mixture with the second mixture.

2. The method of claim 1, wherein the $SiO_2/Na_2O$ weight ratio is 3.2.

3. The method of claim 1, wherein ultra low sulphate boric acid is dissolved in water with a magnetic stirrer.

4. The method of claim 1, further comprising increasing the rate of ultra-low sulfated boric acid added to water to reduce gelling time or to decrease gelling time.

5. A soil injection material that improves said soils after a certain gelling time by being applied as a permeation injection to soils up to silt size obtained by the method of claim 1.

* * * * *